United States Patent [19]
Plummer

[11] 3,754,458
[45] Aug. 28, 1973

[54] LIGHT SEAL FOR A REFLEX CAMERA VIEWFINDER

[75] Inventor: William T. Plummer, Concord, Mass.

[73] Assignee: Polaroid Corporation, Cambridge, Mass.

[22] Filed: June 9, 1971

[21] Appl. No.: 151,255

[52] U.S. Cl. .................................................. 95/42
[51] Int. Cl. ........................................... G03b 19/12
[58] Field of Search ........................................ 95/42

[56] References Cited
UNITED STATES PATENTS
3,540,564  11/1970  Ono .................................... 95/42
3,601,027   8/1971  Ono .................................... 95/42

Primary Examiner—Samuel S. Matthews
Assistant Examiner—Michael Harris
Attorney—Brown and Mikulka, Frederick H. Brustman and Michael Bard

[57] ABSTRACT

A resilient flap prevents light from entering a reflex camera through a viewfinder during a photographic exposure. A film unit stored in the camera is covered by a capping plate during framing and focusing. When the shutter operates, the capping plate pivots about one end to uncover the film unit for an exposure. The resilient flap is swung by the free end of the capping plate to a position where it will block light which would otherwise enter the camera through the viewfinder. The use of a resilient material in the flap allows it to conform to a non-rigid wall which separates the viewfinder from the camera.

12 Claims, 4 Drawing Figures

Patented Aug. 28, 1973

INVENTOR
WILLIAM T. PLUMMER
BY Brown and Mikulka
and
Frederick H. Brustman
ATTORNEYS Patented Aug. 28, 1973  3,754,458

INVENTOR
WILLIAM T. PLUMMER
BY Brown and Mikulka
and
Frederick H. Brustman
ATTORNEYS

LIGHT SEAL FOR A REFLEX CAMERA VIEWFINDER

BACKGROUND OF THE INVENTION

The present invention is particularly useful in a folding reflex camera such as the one described in U.S. Pat. application, Ser. No. 28,567, filed Apr. 15, 1970, in the name of Edwin H. Land, and assigned to Polaroid Corporation.

In such a camera, a flexible boot encloses an exposure chamber so that the lightight integrity of the chamber can be maintained whether the camera is erected for use or folded for storage. An aperture in an upper surface of the flexible boot permits light from the focal plane to enter a viewfinder. At certain times, e. g., during an exposure, it is necessary to prevent light from traveling in the opposite direction and entering the exposure chamber through the viewfinder via the aperture in the flexible boot. Because the aperture is in a flexible member, it is impractical to use common means, such as shutter blades, for closing it. There is no practical way to attach such means to the flexible boot which will keep it aligned with the aperture, and there is no room for a typical closing mechanism when the camera is folded for storage. Further, the flexible nature of the surface surrounding the aperture raises serious doubts as to whether rigid mechanical components can adequately close the aperture and also whether or not such mechanical components would interfere with the proper collapsing of the flexible boot when the reflex camera was folded for storage.

In the aforementioned reflex camera, a capping plate carrying a mirror, which mirror is part of the photographic optics, must be rotated upwards prior to exposing a film unit to uncover the film unit and put the mirror into the required position. Typically, the upward rotation of the capping plate is initiated by operating the shutter release. The capping plate must then move into its upward position and stop with the mirror in place. This must be done quickly to avoid delay between operating the shutter release and opening the shutter. Further, the capping plate carrying the mirror must not jolt the camera when it stops in the upward position lest a photographer's aim be disturbed, and it must not bounce or vibrate lest the resulting motion of the mirror blur a photograph.

An object of the present invention is to provide means for closing the aperture in the flexible boot during photographic exposures.

Another object of the present invention is to reduce the impact of the capping plate stopping in its upward position.

Yet another object of the present invention is to reduce bouncing and vibration of the mirror during a photographic exposure.

A further object is to provide a single means for accomplishing the preceding objects.

SUMMARY OF THE INVENTION

These and other objects of the invention are accomplished by a flexible member attached to the moving end of a reflex mirror. A rubber boot encloses an exposure chamber where the reflex mirror and a film cassette are situate so as to exclude light from the chamber. In an upper wall of the boot, a small aperture admits light from a focusing screen attached to the backside of the mirror into a viewfinder located above the camera. During a photographic exposure, the reflex mirror rotates upward, and, as it does, it swings the flexible member into contact with the upper wall. Continued rotation drags the flexible member along the wall to close the aperture in the upper wall to prevent light from entering the exposure chamber through the viewfinder and fogging a film unit. To insure complete closure of the aperture, the flexible member has a shape which conforms closely to the shape of the upper wall, especially in the area surrounding the aperture. In the preferred embodiment, the flexible member is formed with a dimple to accommodate a short projection of the upper wall into the exposure chamber in the area immediately surrounding the aperture.

There is only a small amount of space between the edges of the reflex mirror and the sides of the boot. During the initial upward rotation of the reflex mirror, air can readily escape from the diminishing space between the reflex mirror and the top of the boot. Before the reflex mirror reaches its uppermost position, the flexible member contacts the upper wall, thereby restricting the escape of air. The restricted air flow and the friction of dragging the flexible member along the upper wall dampen the impact of the reflex mirror stopping at its uppermost position.

DESCRIPTION OF THE DRAWINGS

Other objects and many of the attendant advantages of the present invention will be better appreciated and said invention will become more clearly understood by reference to the following detailed description when considered in conjunction with the accompanying drawings illustrating one embodiment of the instant invention, wherein.

THE PREFERRED EMBODIMENT

Figure 1:
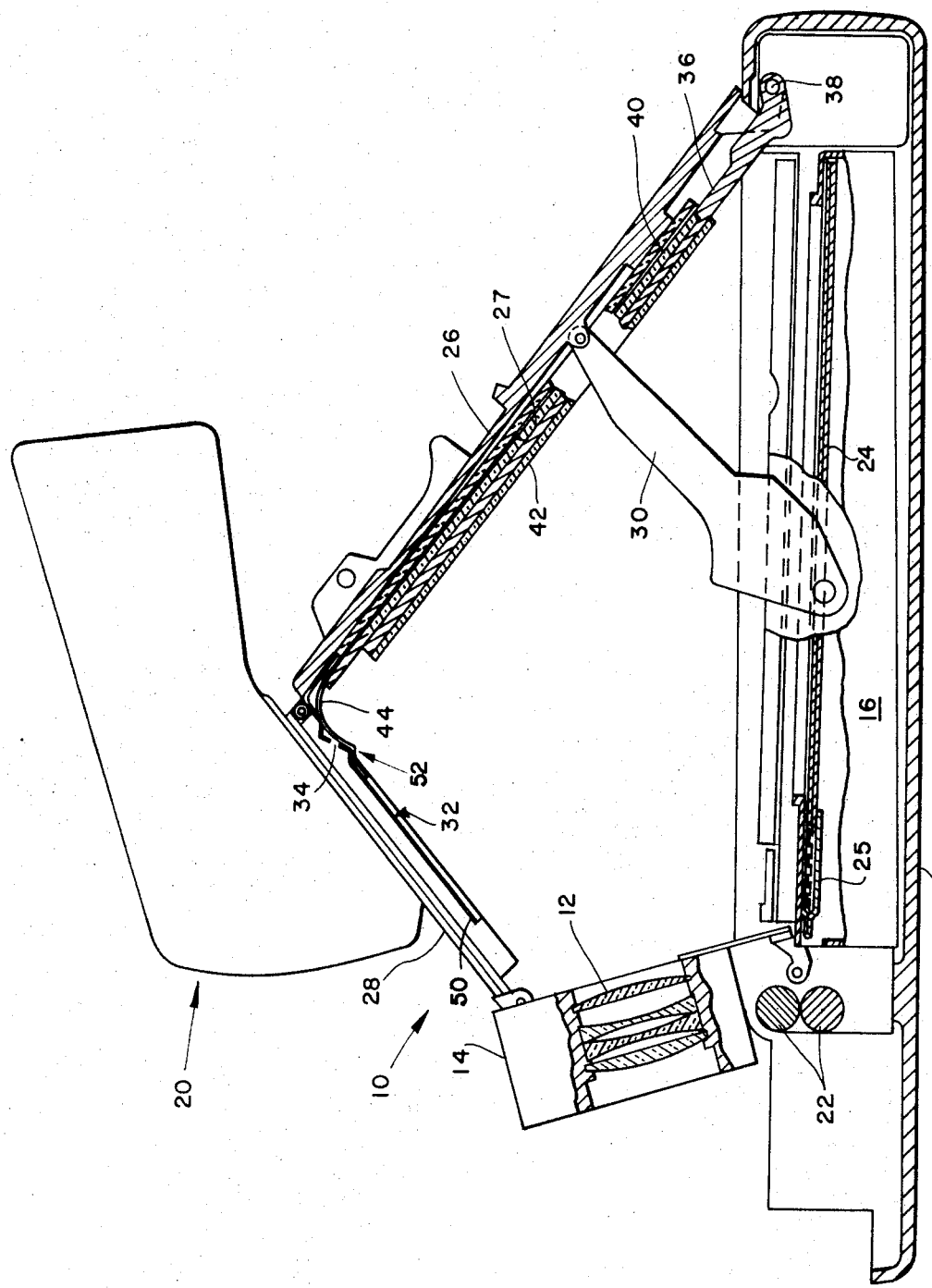
FIG. 1 illustrates a cross-section of a camera with a resilient flap covering an entrance aperture of a viewfinder.

The kind of folding reflex camera for which the present invention is especially suited can be better understood by reference to the above-mentioned U.S. Pat. application, Ser. No. 28,567. FIG. 1 illustrates the general arrangement of components in the reflex camera 10. It has an objective lens 12 mounted in a front housing 14, means for receiving a film cassette 16 in the base 18 of the camera 10, and a viewfinder 20 by means of which a photographer can aim and focus the camera 10. The camera 10 also has a pair of rollers 22 which receive a self-processing film unit 24 as it emerges from the cassette 16, rupturing a chemical pod 25 and discharging the film unit 24 from within the camera 10, in a manner well known in the art.

The front housing 14, the viewfinder 20, as well as a long cover 26 and a short cover 28, are articulated such that they can be erected to form an exposure chamber over the base 18 as shown in FIG. 1. Their articulation permits them to fold together with the base 18 to form a compact unit for storage. A viewing mirror 27 attached to the underside of the long cover 26 reflects the image formed by the objective lens 12 toward a viewing plane of the camera 10 proximate the film unit 24. The viewing mirror 27 also reflects light emanating from the image formed in the viewing plane into the viewfinder 20. An arm 30 maintains the articulated members erect to form the exposure chamber. To fold the camera 10 for storage, the photographer pushes on the arm 30 to unlock it, permitting the articulated members 26 and 28 to fold flat.

Within the exposure chamber, partically defined by the articulated members 26 and 28, is a flexible bellows 32 (for clarity shown only in part in FIG. 1) which excludes light from the exposure chamber except as admitted by the objective lens 16 during an exposure. An aperture 34 located in the upper portion of the bellows 32 permits light in the exposure chamber to enter the viewfinder 20. The aperture 34 must be closed during a photographic exposure to prevent stray light entering the viewfinder 20 from reaching the film unit 24.

Within the bellows 32 is a capping plate 36 which rotates about an axle 38. The capping plate 36 carries a focusing screen 40 on its upper surface and carries a reflex mirror 42 on its underside. A flexible but resilient flap 44 attached to the swinging end of the capping plate 36 covers the aperture 34 when the capping plate 36 rotates to its uppermost position. The flap 44 extends approximately the full width of the capping plate 36. The configuration illustrated in FIG. 1 is the photographic exposure mode of the camera 10. The capping plate 36 rotates to its extreme clockwise position uncovers the uppermost film unit 24 within the cassette 16. In its extreme clockwise position, the capping plate 36 places the flap 44 over the aperture 34 to block light which might otherwise reach the film unit 24 through the aperture 34, and it positions the reflex mirror 42 so it will reflect the image formed by the objective lens 16 onto the photosensitive surface of the film unit 24.

Figure 4:
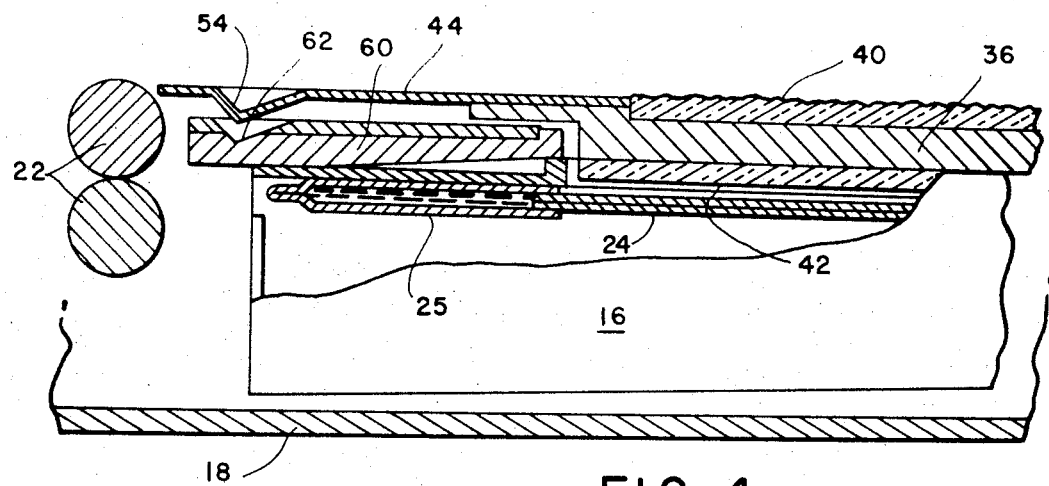
FIG. 4 illustrates the position of the resilient flap when the entrance aperture is uncovered.
Figure 3:
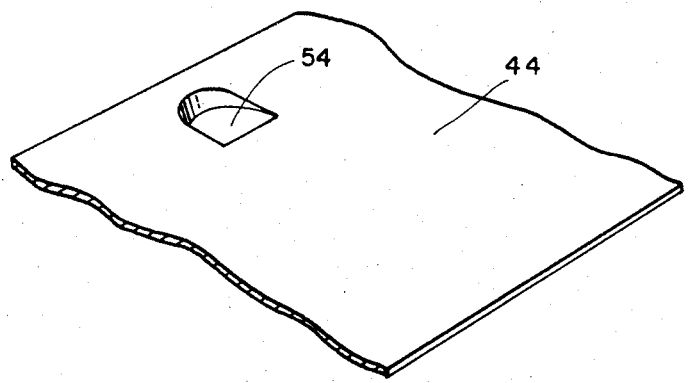
FIG. 3 illustrates a detail of the resilient flap.

In the other mode of camera 10, the focusing mode (not illustrated by FIG. 1, but a detail of which is shown in FIG. 4), the capping plate 36, rotated to its extreme counterclockwise position, rests against the cassette 16 thereby covering the film unit 24 within the cassette 16. In its extreme counterclockwise position, the capping plate 36 positions the focusing screen 40 in the viewing plane of the camera 10 and, of course, it removes the flap 44 from the aperture 34 thereby permitting light, reflected by the focusing screen 40, to enter the viewfinder 20.

Figure 2:
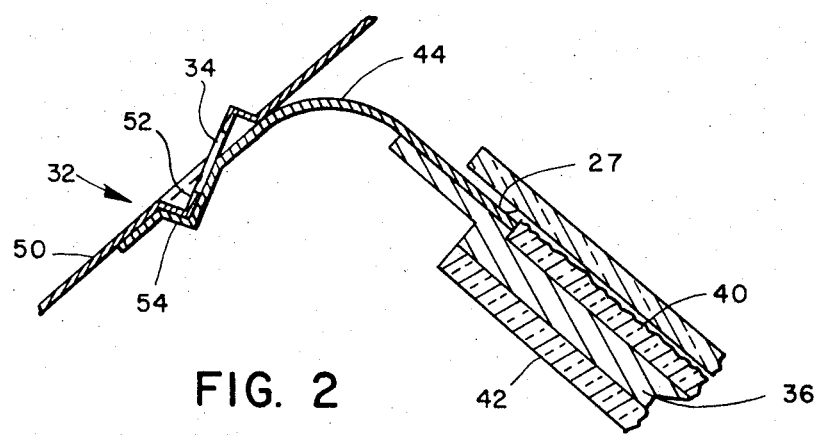
FIG. 2 illustrates an enlarged portion of the device of FIG. 1 showing the light-tight seal effected by the resilient flap against the entrance aperture.

Reference should now be had to FIG. 2 for a better understanding of how the flap 44 seals the aperture 34 in the bellows 32. Certain considerations pertinent only to the optical design of the viewfinder 20 suggest a particular orientation for the plane of the aperture 34 to achieve optimum imagery therein. However, due to mechanical considerations pertinent to the design of the bellows 32 and the exposure chamber, the preferred plane for the forward wall 50 of the bellows 32 is parallel to the small cover 28. To satisfy both conditions, the forward wall 50 is formed with a tilted section 52. The section 52, in which the aperture 34 is formed, has the orientation desired for optical considerations, whereas the remainder of the forward wall 50 follows the small cover 28. The small amount of space in a compact folding camera 10 of the present type makes it preferable that the section 52 not project out of the general plane of forward wall 50 very much. Therefore, the area of the section 52 is quite small, not much greater than the actual size of the aperture 34, and it is positioned to project equally on both sides of forward wall 50. In consequence, the flap 44 must somehow be tailored to fit over the projection of the section 52 into the exposure chamber if it is to make proper contact with the forward wall 50 to seal the aperture 34. Forming a sloping dimple 54 in the flap 44 is found to be a suitable way to avoid the possibility that the projection of section 52 into the exposure chamber might prevent the flap 44 from adequately sealing the aperture 34. FIG. 4 illustrates the section of the flap 44 in which the dimple 54 is formed. The dimple 54 need only be wide enough and deep enough to receive the inward projection of section 52.

FIG. 2 shows the capping plate 36 in its extreme clockwise (uppermost) position with the flap 44 bearing against the forward wall 50 and closing the aperture 34. The area of the flap 44 in contact with the forward wall 50 of the bellows 32 affords an excellent light seal. Furthermore, the flexible nature of the flap 44 allows it to conform to the bellows 32 and thereby seal the aperture 34 without regard to minor distortions in the configuration of the bellows 32.

The flap 44 is urged into this conforming contact with the bellows 32 by its own resiliency which causes it to resist backward bending as the capping plate 36 moves upwardly bringing the flap 44 into contact with the bellows 32. This means of sealing the aperture 34 might distort the shape of the aperture 34 slightly or temporarily urge it out of its preferred location, yet it seals nevertheless. Moreover, it has the advantage that when the capping plate 36 rotates downward, disengaging the flap 44 from the bellows 32, no part of the aperture closing means remains in contact with the bellows 32. Therefore, the aperture 34 returns immediately to the preferred position and no mechanical parts remain behind to distort it or pull it out of position.

When the capping plate 36 rotates downward covering the cassette 16 to protect the film unit 24, it removes the flap 44 from the aperture 34. Thus, light from an image formed on the focusing screen 40 can enter the viewfinder 20. While the camera 10 is in the viewing mode, light enters the exposure chamber. To prevent the fogging of the uppermost film unit 24, capping plate 36 has sealing means to prevent the entrance of light into the cassette 16. In addition to its primary function, the flap 44 serves an auxiliary function as part of the sealing means for the cassette 16. A section 60 of the camera 10 opposite the flap 44 (in the focusing mode, see FIG. 4) has a receptacle 62 into which the dimple 54 can fit. Thus, the flap 44, which extends forward some distance and is also relatively wide, can come quite close to the section 60 and, consequently, inhibit or prevent the passage of stray light between the section 60 and the flap 44.

In cameras of the type described, it is important to minimize the possibility of certain dynamic affects, stemming from the rapid upward rotation of the capping plate 36, which might adversely affect the quality of photographs. Vibration and bouncing of the mirror 42, which is carried on the capping plate 36, causes the image it reflects to move about on the film unit 24 creating a blurred photograph. This occurs in two ways: the image on the film unit 24 moves about due to changes in the angle of incidence of thee light at the mirror 42; and, the image goes in and out of focus because the bouncing of the mirror alters the optical distance between the objective lens 16 and the film unit 24. It should be understood that the reflection at the mirror 44 magnifies the dynamic behavior of the mirror as it affects the image on the film unit 24. Further, too great an impact of the capping plate at its uppermost point might jolt the camera 10, throwing off the user's aim. For reasons not fully understood, it has been found that the capping plate 36, together with the flap 44, does not suffer from these adverse dynamic affects. Significant amounts of bounce or vibration or jolt are not experienced when the capping plate 36 is operated.

It is theorized that as the capping plate 36 reaches its uppermost position and the flap 44 comes into contact with the forward wall 50 of the bellows 32, continued upward movement requires the flap 44 to quickly bend back bringing more area of the flap 44 into contact with the wall 50 of the bellows. Thus, frictional drag between the flap 44 and the bellows 32 increases rapidly just as the capping plate 36 arrives at its uppermost position. Additionally, the flap 44 contacts the forward wall 50 of the bellows 32 and inhibits the escape of air from the diminishing space between the capping plate 36 and the long cover 26. It follows that since air can now only escape through the small gaps between the capping plate 36 and the side walls of the bellows, the arrangement, aforesaid, dampens the impact of the capping plate 36 to prevent any consequential bounce or vibration of the reflex mirror 42.

It can be readily seen that many variations and modifications of the present invention are possible in light of the aforementioned teachings, and it will be apparent to those skilled in the art that various changes in form and arrangement of components may be made to suit requirements without departing from the spirit and scope of the invention. It is, therefore, to be understood that within the scope of the appended claims, the instant invention may be practised in a manner than otherwise specifically described herein.

What is claimed is:

1. A reflex camera comprising:
    a film plane;
    an objective lens;
    a viewfinder;
    an aperture that allows light to pass between said viewfinder and said film plane;
    a mirror normally disposed in a first position in which said mirror covers said film plane of said camera, said mirror being movable, by rotating about an axis disposed at one end thereof, to a second position in which said mirror reflects an image formed by said objective lens towards said film plane;
    operating means for moving said mirror from said first position to said second position; and
    a resilient and flexible member, attached to the other end of said mirror, opposite said axis and extending therefrom a fixted and sufficient distance, to prevent light from reaching said film plane through said viewfinder by blocking said aperture when said mirror is in said second position.

2. The reflex camera described in claim 1, wherein said resilient and flexible member is a flap that engages a wall of an enclosure, which contains said mirror and said film plane, as said mirror approaches said second position, said wall having a shape such that said flap is increasingly bent as said mirror approaches said second position.

3. The reflex camera described in claim 2, wherein said resilient and flexible member is a flap having a shape which conforms to the shape of said wall at a region surrounding an aperture, in said wall, through which light communicates between said viewfinder and said enclosure.

4. A reflex camera comprising:
    an exposure chamber;
    an objective lens to form a real image inside said exposure chamber on a focal plane;
    a viewfinder, having an entrance aperture located in a wall of said exposure chamber, to provide a means foor observing said real image;
    mirror means pivotally mounted adjacent one side of said focal plane, covering a film plane, so as to rotate between a first position covering said focal plane and a second position, uncovering said film plane and oblique thereto, whereat said mirror means reflects said real image formed by said objective lens to said film plane; and
    a flexible and resilient flap-like member, attached to said mirror means, for blocking light that might otherwise pass through said entrance aperture when said mirror means reflects said real image.

5. The reflex camera of claim 4, wherein said flap-like member for blocking light has a width not exceeding the width of said mirror means.

6. The reflex camera of claim 4, wherein said means for blocking light extends beyond said mirror means so as to close said entrance aperture when said mirror means is at said second position.

7. In combination with a camera of the type having: a film plane; an objective lens; a viewfinder; mirror means normally disposed in a first position covering said film plane and rotatable, about a pivot located near one end of said mirror, between said first position and a secondd position where said mirror reflects an image formed by said objective lens toward said film plane; operating means for rotating said mirror from said first position to said second position; an enclosure containing said mirror and said film plane and having an opening in one surface for admitting light from said objective lens; and an aperture in a wall of said enclousre for allowing light from said enclosure into said viewfinder; the improvement which comprises:
    a reesilient and flexible tab member substantially larger than said aperture, attached to the end of said mirror furthest from said pivot, with a shape generally conforming to the shape of said wall surrounding said aperture, and extending beyond said furthest end so said tab member closes said aperture while said mirror is in said second position.

8. The improvement described in claim 7, wherein said wall has a tilted portion surrounding said aperture and said tab member has a dimple to fit over said tilted portion.

9. The improvement, for use with a camera of the type having: a film plane; an objective lens; a viewfinder; a mirror normally disposed in a first position covering said film plane and rotatable, about one edge, between said first position and a second position where said mirror reflects an image formed by said objective lens towards said film plane; operating means for rotating said mirror from said first position to said second position; an enclosure with at least one wall containing said mirror and said film plane and having an opening in a forward surface for admitting light from said objective lens; and an aperture in said wall of said enclosure for allowing light from a focusing screen in said enclosure to enter said viewfinder, comprising:

a resilient flap attached to the moving end of said mirror, said resilient flap extending a sufficient distance beyond said moving end to close said aperture when said mirror is in said second position.

10. The improvement described in claim 9, wherein said resilient flap has a dimple to receive a projection, surrounding said aperture, of said wall into said enclosure so as to permit said resilient flap to conform to said wall.

11. A photographic camera comprising:

means for defining an exposure chamber having an aperture disposed therethrough and including a film plane;

an objective lens for selectively exposing a film unit positioned at said film plane to image-carrying light rays;

a capping plate mounted within said exposure chamber for displacement between a first position wherein it precludes light rays entering said chamber through said aperture and said objective lens from impinging upon said film plane and a second position wherein it does not preclude light rays entering said chamber through said aperture and said objective lens from impinging upon said film plane;

a viewing device communicating with said chamber through said aperture; and a resilient and flexible flap extending from said capping plate for automatically covering said aperture to preclude light rays from entering said chamber therethrough whenever said capping plate is disposed in its said second position.

12. The camera of claim 11, wherein said capping plate comprises a mirror operative to reflect light rays entering said chamber through said objective lens towards said exposure plane when said capping plate is in its said second position.

* * * * *